April 14, 1959

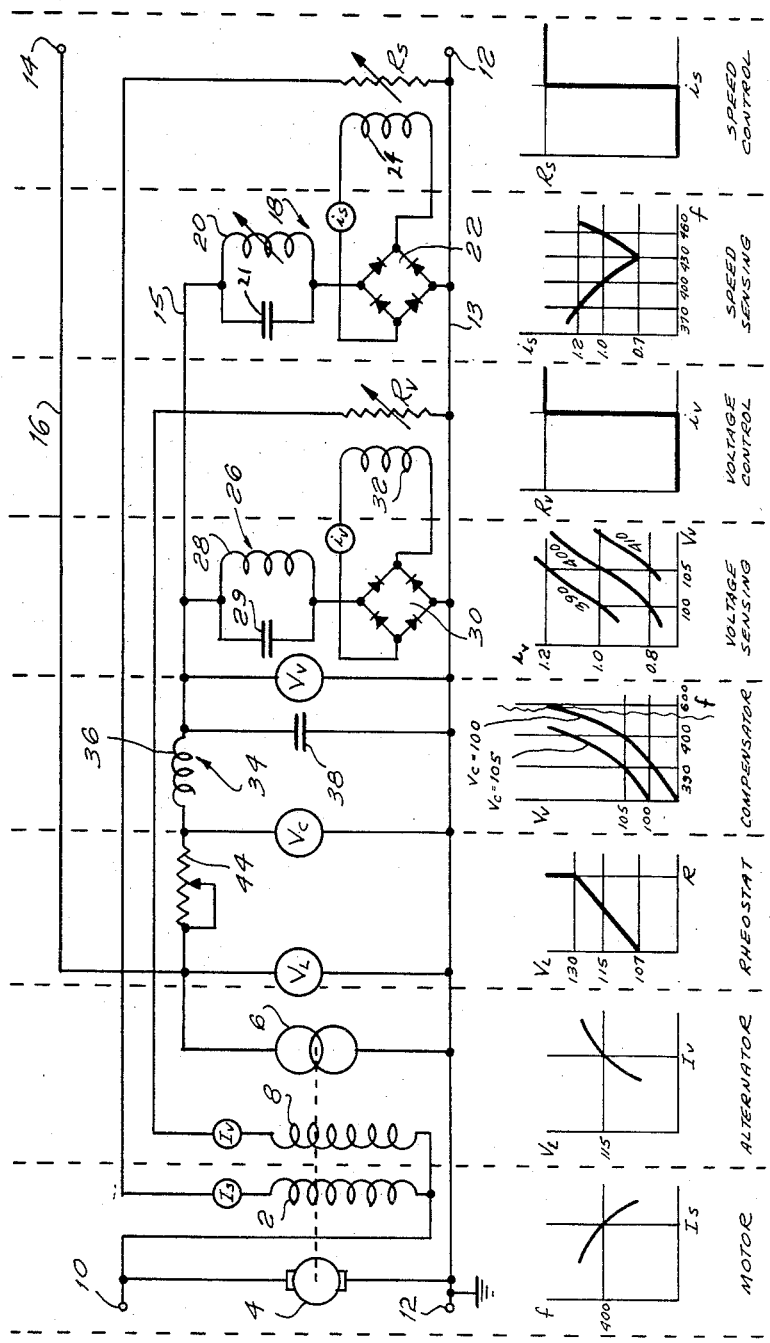

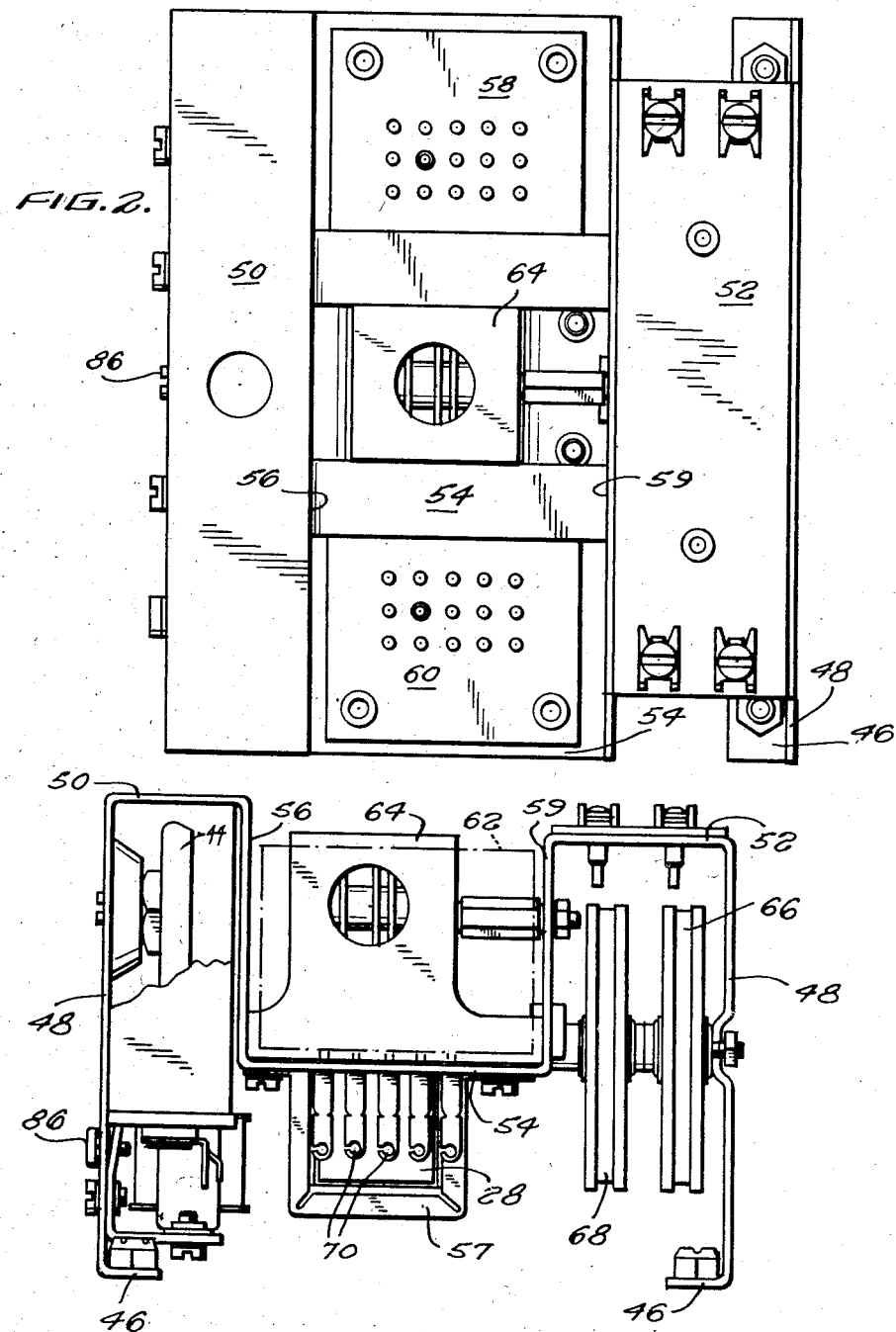

A. M. COHEN 2,882,481

HIGH PERFORMANCE SPEED AND VOLTAGE CONTROL SYSTEM
FOR INVERTERS AND THE LIKE

Filed Feb. 23, 1954

INVENTOR
ARTHUR M. COHEN
BY
ATTORNEYS

United States Patent Office 2,882,481
Patented Apr. 14, 1959

2,882,481

HIGH PERFORMANCE SPEED AND VOLTAGE CONTROL SYSTEM FOR INVERTERS AND THE LIKE

Arthur M. Cohen, Westport, Conn.

Application February 23, 1954, Serial No. 411,913

13 Claims. (Cl. 322—32)

The present invention relates to a system for controlling the speed of operation and the voltage output of a motor-generator system, and particularly of an inverter, that is to say, a D.C. motor-driven alternator. A particular feature of the invention is its non-electronic character.

In order to control a motor-alternator frequency converter, means are required for sensing, power amplifying and anti-hunting both for voltage and speed or frquency. Particularly where high performance is required, the conventional means of sensing voltage has been the use of a temperature-saturated diode or the rectification of the alternator output and its comparison to a stable voltage reference such as that provided by a voltage regulator tube. For speed sensing the alternator output is generally passed through a frequency discrimination circuit in the form of an R-C or R-L or R-L-C network, after which the voltage is again rectified and compared with a stable standard. The greater the degree of accuracy required in the system, the more complex have the electronic control circuits tended to become, so much so that it is almost as much of a problem to keep the control circuit operating in its designed manner as to keep the motor regulated properly.

The drawbacks of electronic regulating systems, even when used to regulate voltage or speed alone, are well recognized. When an attempt is made to simultaneously regulate both the voltage and the frequency of an alternator, as in an inverter installation or the like, the difficulties may be considered as increasing geometrically rather than arithmetically because the functioning of each of the instrumentalities for control of a given parameter reacts adversely on the controlling instrumentality for the other parameter. This is particularly the case where the values of voltage and frequency desired are made adjustable within limits. An attempt to change the operating voltage, for example, from 110 volts to 120 volts, may give rise to a change in regulated frequency from 400 c.p.s. to 410 c.p.s. Similarly, in a given installation if the regulated frequency is changed from 400 c.p.s. to 380 c.p.s. the regulated voltage may drop from 110 volts to 107 volts.

Non-electronic sensing means sensitive to voltage or frequency are, of course, known. One such instrumentality is a ferro-resonant L-C network. However, the use of such non-electronic instrumentalities in high performance regulating systems of the type under discussion has in the past proved unfeasible, largely because of the fact that such ferro-resonant networks are both frequency and voltage sensitive. This restricts their use as voltage references because the frequency and the wave form of the alternator output to be regulated is seldom constant, and because the speed and voltage regulating systems interact with one another.

According to the present invention a non-electronic speed and voltage control system has been devised which, because of its specific design, can utilize circuit arrangements which are both voltage and frequency sensitive as individual voltage and frequency sensing instrumentalities, these circuit arrangements being so connected to one another and to other simple and reliable circuit components that the voltage-sensitivity of the frequency-controlling instrumentality and the frequency-sensitivity of the voltage controlling circuit will be compensated for or rendered ineffective. As a result the non-electronic system of the present invention will equal in performance some of the most complicated, and correspondingly undependable, electronic regulating systems. In addition, the system of the present invention is so designed as to minimize the effect on the regulating systems of wave form changes in the alternator output, thus providing for substantially uniform regulation under all conditions of load and for a wide variety of specific types of equipment. The present system also effectively eliminates interaction of the relatively fast-acting voltage servo loop and the relatively sluggish (because of mechanical inertia) speed or frequency servo loop.

In the form here specifically disclosed, the system, in addition to providing non-electronic sensing circuits, also utilizes non-electronic power amplifiers and servo mechanisms in the form of individual electromagnetic units of the type disclosed in Cohen Patent 2,550,779, these units varying respectively the amount of resistance in the field of the D.C. motor which drives the generator to control frequency or speed of operation, and the amount of resistance in the field of the generator itself to control voltage. These electromagnetic units include a solenoid coil, preferably although not necessarily D.C. powered, the energization of which controls the amount of resistance connected into the corresponding motor field by moving a dashpot-damped armature which causes the sequential opening and closing of a plurality of switches or contact pairs appropriately connected to a network of resistors. These units have an inherent sensitivity and accuracy which improves the overall operating characteristics of the system beyond those which would be obtained from the use of the reasonant sensing circuits alone. Other specific types of auxiliary units could also be employed, such as carbon pile regulators or magnetic amplifiers. These auxiliary units could be dispensed with entirely, but with corresponding loss in overall system accuracy.

The parameter sensing circuit which energizes the solenoid coil of the voltage-control unit preferably is a tuned circuit comprising a coil which, in its operating range, has its magnetic field so saturated that the tuned circuit is extremely sensitive to changes in voltage applied thereacross. The tuned circuit is also sensitive, however, to the frequency of the voltage applied thereto.

In the past in other voltage regulating systems variation in the value of the regulated voltage has usually been achieved either by varying the value of the inductance in the tuned circuit or by varying a resistance connected between the tuned circuit and the solenoid coil of the electromagnetic unit. Both of these methods of varying the regulated voltage cause the actual adjusted value of the output voltage to be applied to the frequency-control instrumentality.

The parameter-sensing adjustably tunable circuit which energizes the solenoid coil of the frequency-control unit, in this system as in many other systems, is tuned by varying the air gap in the magnetic circuit thereof so that the regulated value of the frequency may be adjusted within limits. Because of the appreciable air gap in its magnetic circuit, such a tuned circuit is very sensitive to changes in the frequency of the voltage applied thereto. It is, however, also sensitive to the voltage applied thereto, and any change in that voltage, such as that which would be produced by adjustment of the inductance in the voltage-sensing circuit or of the resistance in series with the solenoid coil of the voltage-control electro-magnetic unit, will give rise to variations in the output of the frequency-controlled circuit.

The interaction between the voltage- and frequency-control systems will therefore be apparent. Assume that the voltage is to be held constant and the frequency is to be changed. The sensing circuit, including the saturated coil, which energizes the solenoid coil of the voltage control unit is frequency-sensitive. Any variation of the frequency applied thereto will cause a change in its effect on the solenoid coil associated therewith, and that change will be the more appreciable the sharper the tuning of the sensing circuit in question. For example, if 105 volts applied to the voltage-control tuned circuit at a given frequency of 400 c.p.s. would cause the voltage control unit to remain in a state of equilibrium, a change in frequency of the voltage applied thereto to 390 c.p.s. will give rise to an increase in the energization of the solenoid coil of the voltage-control electromagnetic unit, a greater amount of resistance will be inserted into the generator field, and the value of the regulated output voltage will decrease to, say 100 volts before equilibrium of the voltage unit is again attained, an undesired result.

A change in the magnitude of the regulated voltage, whether accomplished by placing resistance in series with the solenoid coil of the voltage control unit or by varying the inductance of the coil in the tuned control circuit associated therewith, will ordinarily adversely affect the regulated value of frequency. This will be apparent from the following reasoning: The resultant change in output voltage of the generator has been applied to the frequency-controlling tuned circuit as well as to the voltage-controlling tuned circuit. The degree to which the frequency-control tuned circuit will energize the solenoid coil of the associated electromagnetic unit will depend in part upon the magnitude of the voltage to which the frequency-control tuned circuit is subjected. Changes in energization of the solenoid coil will in turn cause the amount of resistance in the motor field to vary, thus producing a change in output frequency, an undesirable result. For example, if the regulated voltage at 400 c.p.s. is changed from 110 volts to 120 volts, the solenoid coil of the frequency-controlling electromagnetic unit will be energized above its equilibrium value. The resistance in the field of the motor driving generator will be changed to cause the motor to rotate more rapidly, thus raising the frequency of the generated output to, say, 410 c.p.s. before restoring the energization of the solenoid coil to equilibrium value.

The conditions under which the unit operates complicate the situation. At no load the output of the alternator may approximate a true sine wave. However, as the load is increased, higher harmonics begin to appear, the magnitude and nature of these harmonics varying from load to load and from machine to machine. In a typical situation full load may produce 5% of the eleventh and thirteenth harmonics. These harmonics, as they pass through the tuned circuits both of the voltage- and frequency-control systems, are sensed by those circuits and produce changes in the energization of the solenoid coils of the control units. For example, a system which will maintain 400 c.p.s. at no load may, when a sufficiently high harmonic content is sensed, regulate at 420 c.p.s. Comparable variations in regulated voltage will also obtain. It may be emphasized that this factor is significant even if only voltage or frequency alone is to be controlled.

Another complicating factor is the difference in the speeds of response of the voltage and frequency control systems. Because of the inertia of the rotating parts of the motor and alternator, the frequency will vary very sluggishly in response to the action of the frequency-sensing instrumentality when compared to the response of the voltage system, which is purely electrical and therefore not subject to mechanical inertia (except perhaps for the effect of the moving parts of the electromagnetic unit, which, if that unit is properly designed, is negligible). Hence unless some means is provided for eliminating the interaction between the frequency and voltage control systems not only will adjustment of the desired value of voltage or frequency effect the other parameter, but a constant, and perhaps increasing, hunting or variation will inevitably result. The relatively fast-acting voltage servo loop will tend to follow the oscillations of the sluggish speed servo loop, and this in turn will cause continued oscillation in the speed servo loop.

According to the present invention, a simple frequency and voltage control system has been devised which does not sacrifice any of the advantages of the use of electromagnetic units in conjunction with tuned circuits, which substantially eliminates the adverse interaction between the voltage and frequency control systems, and which also substantially eliminates the undesirable effect of higher harmonics on the accuracy of regulation. These results are achieved by connecting in advance of the voltage- and frequency-control instrumentalities, whatever their specific form, a compensating network which has a frequency-voltage characteristic is substantially opposite in nature to that of the tuned circuits of the control instrumentalities over the normal operating range and which also attenuates and bypasses the higher harmonics in the output, and by connecting a voltage adjusting rheostat in the circuit in advance of the compensating network, that rheostat constituting the sole instrumentality by means of which the value of the regulated voltage may be changed.

The compensating network may consist of an inductance in the line and a capacitance across the line, the network constituting a low pass filter. Because of its low-pass characteristic the compensating network will not pass any appreciable amount of third and higher harmonics when those are present in the output of the machine. Those higher harmonics will to a great extent be directly attenuated in the inductance in the line, and what remains of them will be indirectly attenuated by being shorted across the line by the condenser, so that they will never reach the tuned circuits of the voltage- and/or frequency-control systems. As a result, whether the generator is operating at no load, full load, or at some point in between, the regulated voltage and frequency will remain substantially constant.

The compensating network, within the range of variations of fundamental frequency at which the system is to operate, has a characteristic voltage-frequency curve which, at the point where it would intersect with a corresponding solenoid voltage-frequency curve of the tuned circuit of the voltage-control instrumentality, has a slope approximately equal to but inclined in the opposite direction from the latter curve. Hence any change in frequency at which the generator is operated, such as that produced by an adjustment of the air gap in the resonant circuit which actuates the solenoid coil of the frequency-control unit, will not have any appreciable effect on the functioning of the voltage control system. This will be apparent from the following reasoning: When the frequency is increased, in the absence of the compensating network, the tendency of the tuned circuit in the voltage control system would be to decrease the energization of the solenoid coil of the electromagnetic unit operatively connected thereto. The compensating network, however, upon an increase in the output frequency, will tend to apply a somewhat greater voltage to the solenoid coil, that increase in applied voltage compensating for the tendency of the tuned circuit to apply a decreased energization thereof.

As indicative of the value of the compensating network, in a typical test of a commercial embodiment of the instant invention rated at 115 volts and 400 cycles, variation in frequency from 380 to 420 c.p.s. resulted in a measured change of no more than ½ volt from the rated 115 volts. When the system was set to operate at 400 cycles and 115 volts, no measurable change in frequency, and only less than half a volt change in voltage was detected, in going from no load to full load conditions.

The voltage adjusting rheostat is connected in the line in advance of the compensating network and the voltage- and frequency-control networks and is so designed as to ensure the application of a uniform voltage to the compensating network and both control systems independently of the actual desired value of the output voltage. For example, in a system rated at 115 volts, the rheostat may be so designed that 100 volts will always be applied to the compensating and control networks. When regulation at 115 volts is desired, sufficient resistance is inserted into the circuit by the rheostat so as to produce a 15 volt drop therein. If regulation of the output is to be changed to 120 volts, the rheostat is adjusted so as to produce a 20-volt drop therein. Initially this will reduce the voltage applied to the voltage control network to 95 volts and that network will operate to cause the output voltage of the generator to increase until the voltage control system senses 100 volts. The actual voltage output of the generator will, of course, be 120 volts, the desired value. Since the same voltage which is applied to the voltage control network is also applied to the frequency control network, it will be apparent that despite adjusted variations in the voltage output of the generator, the frequency control system will continue to regulate at the value to which it is set.

To the accomplishment of the above, and to such other objects as may hereinafter appear, the present invention relates to a speed and voltage control system as defined in the appended claims and as described in this specification taken together with the accompanying drawings, in which:

Fig. 1 is a circuit diagram of one embodiment of the present invention, pertinent characteristics of the various parts of the system being shown graphically beneath those parts;

Fig. 2 is a top plan view of a chassis, with components attached, adapted for use with the system of the present invention and in conjunction with which plug-in-type electromagnetic units such as those shown in Cohen Patent 2,550,779 are adapted to be employed;

Fig. 3 is an end elevational view of the chassis of Fig. 2;

Figure 4:
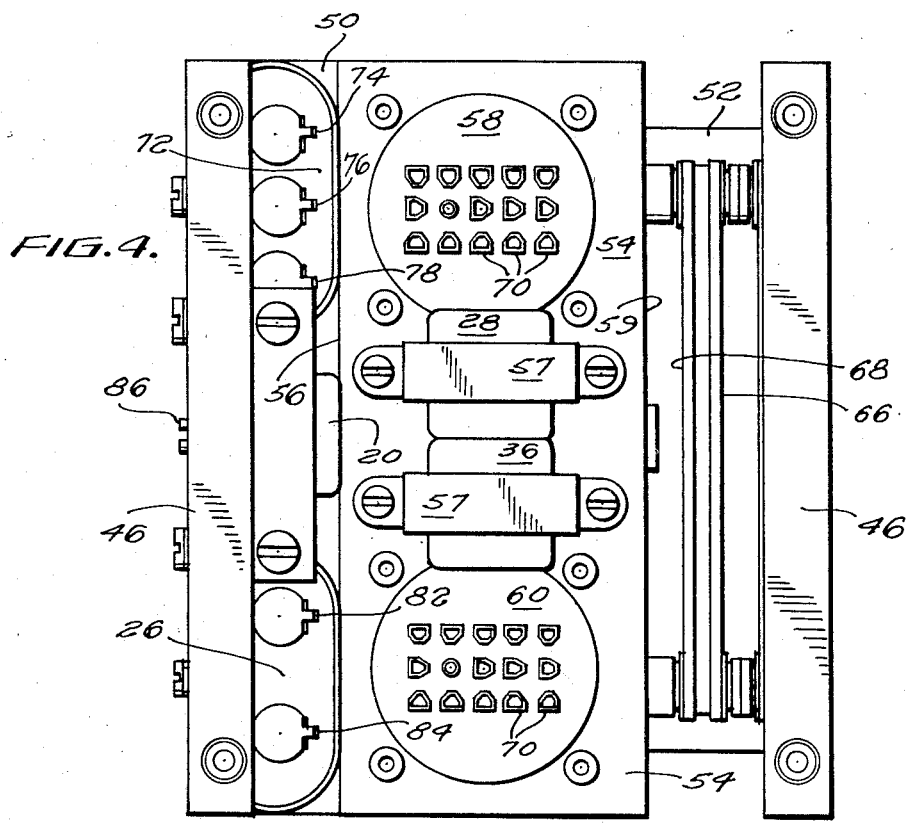
Fig. 4 is a bottom plan view thereof.

Having reference first to Fig. 1 a D.C. motor having a field 2 and an armature 4 drives the rotor 6 of an alternator having a D.C. energized field 8. Direct current is applied between terminals 10 and 12, the motor field 2 being in shunt with the motor armature 4 and the alternator field 8 being in parallel with the motor field 2. The shunt D.C. motor has a characteristic such that as the current $I_s$ through its field 2 increases its speed will decrease. The frequency of the output of the alternator will, of course, be determined by the speed at which its rotor 6 rotates, this in turn being determined by the speed of rotation of the motor armature 4. The alternator has a voltage characteristic such that as the current $I_v$ through its field 8 increases the voltage output $V_L$ will also increase. This alternating voltage output appears across terminals 14 and 12, line 16 connecting the terminal 14 to the appropriate side of the alternator rotor 6.

The frequency or speed sensing instrumentality generally designated 18 comprises an L-C parallel resonant circuit comprising coil 20 and condenser 21 connected between the lines 13 and 15 so that the output of the alternator is applied thereacross. This circuit is tuned to the desired output frequency by varying the inductance of the coil 20 in any appropriate manner. It is preferred that the coil 20 have a magnetic circuit with an air gap therein, since this arrangement increases the frequency-sensitivity of the circuit, and the tuning may be accomplished by adjusting that air gap in any appropriate manner, this having the effect of changing the effective inductance of the coil 20 and at the same time retaining the exceedingly high frequency sensitivity of the circuit. The current which passes through the L-C circuit including the coil 20 is preferably rectified at 22 and the rectified current $i_s$ is passed through the solenoid coil 24 of an electromagnetic unit such as that disclosed in Cohen Patent 2,550,779, this having the effect of varying the amount of resistance $R_s$ connected in series with the motor field 2. Electromagnetic units of the type described have the characteristic that if the value of $i_s$ is below a nominal value the resistance $R_s$ will decrease and if $i_s$ is above a nominal value the resistance $R_s$ will increase, the amount of change being determined by the length of time that $i_s$ departs from its nominal value. The speed of reaction of $R_s$ to departures of $i_s$ from its nominal value is adjusted in accordance with the overall rate of response of the speed-servo loop in order to eliminate hunting. For the speed servo loop, which is sluggish in response, the armature of the electromagnetic unit attracted by the solenoid coil 24 may be spring-coupled to its damping dashpot, thus producing a "lead" which makes the speed control sufficiently rapid so that, when the system is set, for example, for regulation at 400 cycles and when the nominal value of $i_s$ is 1.0, the frequency will never rise beyond about 410 cycles, much less reach the 460 cycle speed which, as will be apparent from the $i_s$–$f$ characteristic curve of the speed sensing system 18, would produce a "runaway" of the motor. The sensitivity of the speed sensing instrumentality 18 will be apparent from its $i_s$–$f$ characteristic curve, a 1% change in frequency producing a 6% change in solenoid current $i_s$.

The voltage sensing instrumentality generally designated 26 comprises an L-C parallel resonant network comprising coil 28 and condenser 29 connected across the lines 13 and 15 so that the output of the alternator rotor 6 is applied thereacross. The inductance coil 28 of this network has a preferably closed magnetizable iron core which is operated at saturation or close thereto, so that a slight increase in the voltage $V_v$ applied thereto changes the permeability of the iron. In turn, this alters the inductance of the coil 28, changing the resonant frequency. A marked increase in the current flowing through the L-C current results, the current is rectified at 30, and the rectified current $i_v$ is passed through the solenoid coil 32 of an electromagnetic unit of the type shown in Cohen Patent 2,550,779, so as to control the value of the resistance $R_v$ inserted in series with the alternator field 8. As evidence of the marked sensitivity of the voltage-sensing instrumentality, it will be noted from its $i_v$–$V_v$ graph that a 5% change in voltage $V_v$ results in a 25% change in $I_v$. The unit itself is the same as that previously described for the speed sensing instrumentality. However, since the voltage output from the alternator rotor 6 is much more rapidly responsive to variations in the current $i_v$ through the coil 8 than is the frequency output to variations in $i_s$ through the motor field 2, the armature of the voltage-regulating electromagnetic unit may be rigidly coupled to its damping dashpot.

As will be seen from the $i_v$–$V_v$ graph for the voltage sensing instrumentality 26, $i_v$, the output of the instrumentality 26, is frequency sensitive, a family of curves being shown representing the relationship between $i_v$ and $V_v$ for frequencies of 390 c.p.s., 400 c.p.s. and 410 c.p.s. respectively. If a value of $i_v$ of 1.0 is considered to be the nominal value for the electromagnetic unit, then that unit will be in equilibrium when $V_v$ equals 105 volts and the frequency is 400 c.p.s. If the frequency should drop to 390 c.p.s., $i_v$ would rise to 1.2, $R_v$ would increase, $I_v$ would decrease, and $V_L$ would also decrease until it reaches a value of 100 volts, at which time the voltage-control electromagnetic unit will again be in equilibrium. In other words, a change in the operating frequency, either accidental or purposeful, would result in a change in the value of the regulated voltage.

In order to prevent this effect a compensator network generally designated 34 is provided, that network comprising an inductance coil 36 connected in the line 15 in advance of the voltage sensing instrumentality 26 and a capacitor 38 connected between the lines 13 and 15. The voltage applied to this compensator network 34 is designated $V_c$. The values of the inductance coil 36 and the capacitor 38 are so chosen that the compensator network 34 will have a characteristic shown in the $V_v$-$f$ graph, a family of curves being shown for values of $V_c$ of 100 and 105 volts respectively. With $V_c$ at 100 volts and the frequency at 400 c.p.s., $V_v$ is 105 volts, thus producing the nominal value for $i_v$ of 1.0 in the voltage sensing instrumentality 26. If now, with the compensating circuit 34 in the system, the frequency should drop to 390 cycles, thus requiring $V_v$ to be 100 volts if the voltage control electromagnetic unit is to be in equilibrium with $i_v$ equalling 1.0 (see the voltage-sensing graph), the compensating circuit 34 will require that $V_c$ should equal 100 volts if $V_v$ is to equal 100 volts, $V_c$ thus having the same value that it would at 400 cycles. Hence although the frequency of the output of the alternator rotor 6 has been changed 10 c.p.s., the voltage output thereof remains unchanged. This obtains whether the change in frequency is due to some external load applied to the rotating equipment or if the regulated value of the frequency is changed by appropriate adjustment of the speed sensing instrumentality 18.

Figure 5:
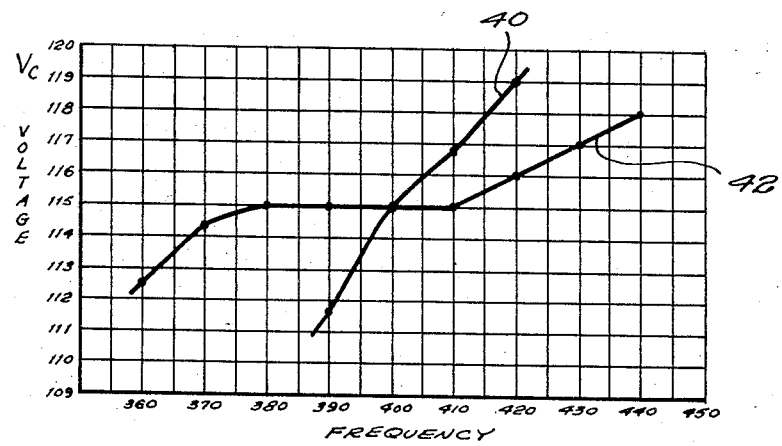
Fig. 5 is a graph comparing the voltage-frequency relationship of the system of the present invention with one in which the compensating circuit of the present invention is not embodied.

Of course, the effect of the compensating circuit 34 will only accurately counterbalance the frequency-sensitivity of the voltage sensing instrumentality 26 over a limited range of frequencies. This is illustrated in Fig. 5, a plot of voltage $V_L$ against frequency, curve 40 representing the characteristic of a system without the compensating network 34 and curve 42 representing the characteristic of a system with the compensating network 34. It will be seen that the voltage remains constant between frequencies of 380 c.p.s. and 410 c.p.s. and that there is less than 1% variation in voltage between frequencies of 370 c.p.s. and 420 c.p.s. when the compensating circuit is employed, whereas without the compensating circuit a drop in frequency from 400 c.p.s. to 390 c.p.s. produces a drop in voltage from 115 volts to approximately 111.5 volts and a rise in frequency from 400 c.p.s. to 410 c.p.s. produces a rise in voltage from 115 volts to approximately 116.75 volts.

The compensating network 34 performs another very important function. It has the characteristic of a low-pass filter. The magnitudes of inductance and capacitance in the network 34 are so chosen that the filter will pass the fundamental frequency of 400 c.p.s. without any appreciable attenuation, but the higher harmonics thereof are attenuated greatly by the network 34, either directly in the inductance 36 or indirectly by being bypassed through the capacitor 38. In practice the network 34 is so designed as to pass the fundamental frequency and its second harmonic, but to attenuate all of the harmonics higher than the second.

This characteristic is significant because the wave form of the output from the alternator rotor 6, that is to say, the harmonic content of that output, will vary greatly from one machine to another, and for a given machine will vary appreciably depending upon the load applied thereto. For example, in going from no load to full load in a typical installation the incidence of higher harmonics may go from zero to 5% of the total output. These harmonics, if they are permitted to reach the sensing instrumentalities, and particularly the frequency-sensing instrumentality 18, will affect the output thereof, and therefore will cause a change in the regulated value of voltage or frequency. For example, if a system set to regulate at a given frequency and voltage at no load, with a low harmonic content, were to be shifted to full load, with a high harmonic content, those higher harmonics, in the absence of a filter, would reach the parameter-sensing networks and would tend to be bypassed by the condenser in those networks. As a result the system would regulate at a higher frequency and at a lower voltage than that for which the system was set at no load. The compensator network 34, by filtering out these higher harmonics, ensures that regulation will take place at substantially the same level, both for frequency and for voltage, independently of the nature of the load applied and independently of the particular wave form of the output of the machine being regulated. The elimination of these higher harmonics has been shown to involve no appreciable drawback for normal operation, since even in the case of machines with extremely poor wave form there is little difference between regulating the average value of the fundamental frequencies and regulating the actual RMS value including the harmonics.

The output of the frequency sensing instrumentality 18, that is to say, $i_s$, is dependent not only on the frequency of the voltage applied thereto but also on the actual value of that voltage. Hence if the regulated voltage value were to be adjusted in the manners generally utilized in the prior art, either by varying the inductance of the coil 28 or by placing a rheostat in series with the solenoid coil 32, changes in the regulated voltage would necessarily involve a change in the level at which the frequency or speed was regulated. In order to eliminate this undesirable interaction between speed and voltage regulation, a variable resistance 44 is inserted in the line 15 between the alternator rotor 6 and the compensating circuit 34, the resistance 44 being adjusted to have a value such that the voltage $V_c$ is always the same, within the limits of desired adjustability of the voltage of the system, independently of the actual voltage output $V_L$ of the alternator rotor 6, it being $V_L$ which is actually supplied to the load. For example, we may arbitrarily assume that the optimum value of $V_c$ is 100 volts and that we wish $V_L$ to be 110 volts. In that event the resistance 44 is increased appropriately. Initially this will cause $V_c$ to drop below 100 volts. This in turn will cause the resistance $R_v$ to decrease and the voltage output $V_L$ of the alternator rotor 6 will increase. When the voltage $V_L$ has reached 115 volts, $V_c$ will again be 110 volts and the system will be in equilibrium. Since $V_c$ is also applied to the frequency sensing instrumentality 18, that instrumentality will regulate frequency at the same value as previously, since it will not "see" any change in the voltage applied thereto. Hence by arranging the voltage adjusting resistance 44 so that the same voltage $V_c$ is applied to the frequency sensing instrumentality 18 for all values of regulated output values $V_L$ within the desired range of operation of the system, frequency regulation is made substantially independent of voltage regulation.

Figs. 2-4 show a unitary chassis which has been designed for the control of a 2500 VA 400 c.p.s. rotary inverter. The chassis as shown is approximately 6" long, 5" wide, and 4" high. It comprises a sheet metal supporting plate having mounting feet 46, upstanding legs 48, top wall portions 50 and 52, and a depressed top wall portion 54 connected to the portions 50 and 52 by means of walls 56 and 58 respectively. Centrally mounted on the bottom of the wall 54 are the inductance coil 28 for the voltage sensing instrumentality 26 and the inductance coil 36 of the compensating network 34, these coils being secured in place by means of brackets 57. The coil 28 may consist of 600 turns of No. 27 wire while the coil 36 may consist of 375 turns of No. 25 wire. At either end of these coils are sockets generally designated 58 and 60 into which the plug-in electromagnetic units of the type shown in Cohen Patent 2,550,779 are adapted to be received, one of those units being shown in phantom in Fig. 3 and represented by the reference numeral 62. A housing 64 is mounted on the wall 54 between the sockets 58 and 60, the housing 64 containing the rectifiers, which may be of the selenium type, which define the rectifier units 22 and 30 of the speed and voltage instrumentalities 18 and 26 respectively. Mounted between the walls 48 and 58 are two plaques of resistors 66 and 68, these resistors being connected to the switches in the electromagnetic units 62 on the sockets 58 and 60 respectively by means of the contact tabs 70 depending from those sockets and respectively defining the variable resistance $R_s$ and $R_v$. A capacitor 72 is mounted between the walls 48 and 56 and has three terminals 74, 76 and 78. The terminals 74 and 76, between which a 1 mfd. capacitance exists, define the capacitor 29 in the voltage sensing L-C network, while the terminals 76, 78, between which a 1 mfd. capacitance exists, define the capacitor 38 of the compensator network 34. A second capacitor 26, the capacitor in the L-C network of the frequency sensing instrumentality 18, is also mounted between the walls 48 and 56, and has terminals 82 and 84 between which a capictance of 2 mfd. exists. An inductance coil is mounted between the capacitors 72 and 26, that coil constituting the variable inductance 20 in the L-C circuit of the speed sensing instrumentality 18, the air gap of the magnetic circuit of which may be varied through rotation of the screw 86 which is appropriately mechanically linked thereto in any suitable manner. The coil 20 may consist of 620 turns of No. 27 wire. The voltage adjusting variable resistance 44 is usually mounted on the chassis here disclosed.

It will be appreciated from the above discussion that a compact, dependable and accurate system for speed and voltage control has been produced in which independent adjustability of speed and voltage is provided, in which the accuracy of operation is the equal of that of much more complicated electronic regulating systems, and which is superior to those systems insofar as reliability and maintenance requirements are concerned. The system here disclosed, without temperature compensation, and when employed on a 2500 VA 400 c.p.s. inverter operated on 28 volts D.C., is able to meet the environmental and better the performance requirements of Armed Forces specification AN-I-10b. The voltage- and speed-sensing instrumentalities could utilize units other than the electromagnetic units shown in Cohen Patent 2,550,779 and, indeed, could entirely dispense with such units provided other means were employed to apply the outputs of the sensing instrumentalities to the fields 2 and 8 in the proper direction. This would entail some loss in sensitivity and accuracy, but might well be satisfactory in many installations where the requirements are less rigorous than those embodied on inverter systems for use in military aircraft. While but a single embodiment of the present invention has been here disclosed, it will be apparent that many variations may be made therein without departing from the spirit of the invention as defined in the following claims.

I claim:

1. A speed and voltage regulating system for a motor-alternator combination comprising a speed regulating instrumentality and a voltage regulating instrumentality controllingly connected to said motor-alternator combination so as to regulate speed and voltage output respectively and both electrically connected to the output of said alternator, and a voltage adjusting rheostat in the circuit between the output of said alternator and both of said instrumentalities.

2. The system of claim 1, in which said voltage regulating instrumentality is frequency-sensitive in a given sense, and in which said filter circuit is frequency-sensitive in the opposite sense and to substantially the same degree, thereby compensating for the frequency sensitivity of said voltage regulating instrumentality.

3. The system of claim 2, in which said filter circuit comprises an inductance in series with said voltage regulating instrumentality and a capacitor in parallel therewith.

4. A speed and voltage regulating system for a motor-alternator combination comprising a speed regulating instrumentality and a voltage regulating instrumentality, said instrumentalities comprising frequency and voltage sensing circuits respectively, each electrically connected to the output of said alternator, and means operatively connected to said circuits and to said motor-alternator combination effective to control the speed and voltage outputs thereof respectively, a voltage-adjusting rheostat in the circuit between the output of said alternator and both said instrumentalities, and a filter circuit electrically connected between the output of said alternator and said instrumentalities capable of passing the frequency corresponding to the desired speed of operation of said alternator without excessive attenuation and effective to attenuate harmonics of that frequency.

5. The system of claim 4, in which said voltage regulating instrumentality is frequency-sensitive in a given sense, and in which said filter circuit is frequency-sensitive in the opposite sense and to substantially the same degree, thereby compensating for the frequency sensitivity of said voltage regulating instrumentality.

6. The system of claim 5, in which said filter circuit comprises an inductance in series with said voltage regulating instrumentality and a capacitor in parallel therewith.

7. A speed and voltage regulating system for a motor-alternator combination comprising a speed regulating instrumentality and a voltage regulating instrumentality controllingly connected to said motor-alternator combination so as to regulate speed and voltage output respectively, said speed regulating instrumentality comprising a parallel-resonant circuit connected to the output of said alternator and effective to sense the frequency of the output thereof, said voltage regulating instrumentality also being electrically connected to the output of said alternator and comprising a voltage sensing circuit, and a voltage-adjusting rheostat in the circuit between the output of said alternator and both of said instrumentalities and effective when adjusted to retain the voltage applied to both of said instrumentalities at a given value despite desired adjustments in the voltage output of said alternator.

8. The system of claim 7, in which said filter circuit is capable of passing the frequency corresponding to the desired speed of operation of said alternator without excessive attenuation and is effective to attenuate harmonics of that frequency.

9. The system of claim 8, in which said filter circuit comprises an inductance in series with said ferro-resonant circuit and a capacitor in parallel therewith.

10. In a speed and voltage regulating system for a motor-alternator combination comprising a speed regulating instrumentality and a voltage regulating instrumentality controllingly connected to said motor-alternator combination so as to regulate speed and voltage output respectively, said speed regulating instrumentality comprising a parallel-resonant circuit connected to the output of said alternator and effective to sense the frequency of the output thereof, said voltage regulating instrumentality comprising a ferro-resonant circuit connected to the output of said alternator and effective to sense the voltage output therefrom; the improvement which comprises a voltage-adjusting rheostat connected in the circuit between the output of said alternator and both of said resonant circuits, said rheostat being effective when adjusted to retain the voltage applied to said resonant circuit constant despite desired adjustments in the voltage outputs of said alternator.

11. The system of claim 10, in which a filter circuit is electrically connected between the output of said alternator and said resonant circuits, said filter circuit being capable of passing the frequency corresponding to the desired speed of operation of said alternator without excessive attenuation and effective to attenuate harmonics of that frequency.

12. The system of claim 10, in which said ferro-resonant circuit is frequency sensitive in a given sense, and in which a filter circuit is electrically connected between the ouput of said alternator and said ferro-resonant circuit, said filter circuit having a frequency sensitivity in the opposite sense from and to substantially the same degree as said ferro-resonant circuit, thereby compensating for the frequency sensitivity of said ferro-resonant circuit.

13. The system of claim 10, in which said ferro-resonant circuit is frequency sensitive in a given sense, and in which a filter circuit is electrically connected between the output of said alternator and said ferro-resonant circuit, said filter circuit comprising an inductance in series with said resonant circuits and a capacitor in parallel therewith and having a frequency sensitivity in the opposite sense from and to substantially the same degree as said ferro-resonant circuit, thereby compensating for the frequency sensitivity of said ferro-resonant circuit, said filter circuit being capable of passing the frequency corresponding to the desired speed of operation of said alternator without excessive attenuation and effective to attenuate harmonics of that frequency.

References Cited in the file of this patent

UNITED STATES PATENTS

| | | |
|---|---|---|
| 2,428,566 | Harder et al. | Oct. 7, 1947 |
| 2,571,827 | Bradley | Oct. 16, 1951 |
| 2,607,028 | Gartner | Aug. 12, 1952 |
| 2,689,326 | Haas | Sept. 14, 1954 |
| 2,717,982 | Spitler et al. | Sept. 13, 1955 |